(12) United States Patent
Hite

(10) Patent No.: US 12,536,127 B2
(45) Date of Patent: Jan. 27, 2026

(54) INSTRUMENTATION SERIAL INTERFACE CONFIGURED WITH A COMMON ADAPTOR MODULE

(71) Applicant: Bradford Thomas Hite, Valencia, CA (US)

(72) Inventor: Bradford Thomas Hite, Valencia, CA (US)

(*) Notice: Subject to any disclaimer, the term of this patent is extended or adjusted under 35 U.S.C. 154(b) by 9 days.

(21) Appl. No.: 18/635,674

(22) Filed: Apr. 15, 2024

(65) Prior Publication Data

US 2025/0321918 A1    Oct. 16, 2025

(51) Int. Cl.
*G06F 13/42* (2006.01)

(52) U.S. Cl.
CPC .............. *G06F 13/4282* (2013.01); *G06F 2213/0042* (2013.01)

(58) Field of Classification Search
CPC ..................................................... G06F 9/3888
See application file for complete search history.

(56) References Cited

U.S. PATENT DOCUMENTS

| | | | |
|---|---|---|---|
| 6,038,400 A * | 3/2000 | Bell | G06F 13/4291 710/16 |
| 2004/0203296 A1* | 10/2004 | Moreton | G06F 13/387 439/894 |
| 2009/0006709 A1* | 1/2009 | Zhao | G06F 13/409 710/315 |
| 2010/0174833 A1* | 7/2010 | Filer | G06F 16/24 707/769 |

* cited by examiner

*Primary Examiner* — Henry Tsai
*Assistant Examiner* — Juanito C Borromeo

(57) ABSTRACT

A unique system for the implementation of an instrumentation serial interface system configured by a common adaptor module for interface with selectable interface modules each providing an instrumentation function/feature is described. More specifically, the invention provides automatic hardware/software reconfigurable implementations by simple connection of the adaptor module to an application specific interface module. Serial interface electrical signaling required to support each type of interface module electrical requirements (power and communications) are provided by the properly configured common adaptor module. Different interface modules are identified through unique identification information retrieved by the adaptor module and transferred to a host computer. The host computer retrieves configuration information from a database based on the identification information. This configuration information is loaded into the common adaptor module to provide the control/timing interface matching interface module configuration. Examples of application specific interface modules could provide functions for: Data Acquisition, Waveform Generation or Sensor interface.

8 Claims, 3 Drawing Sheets

Instrumentation Serial Interface System Block Diagram

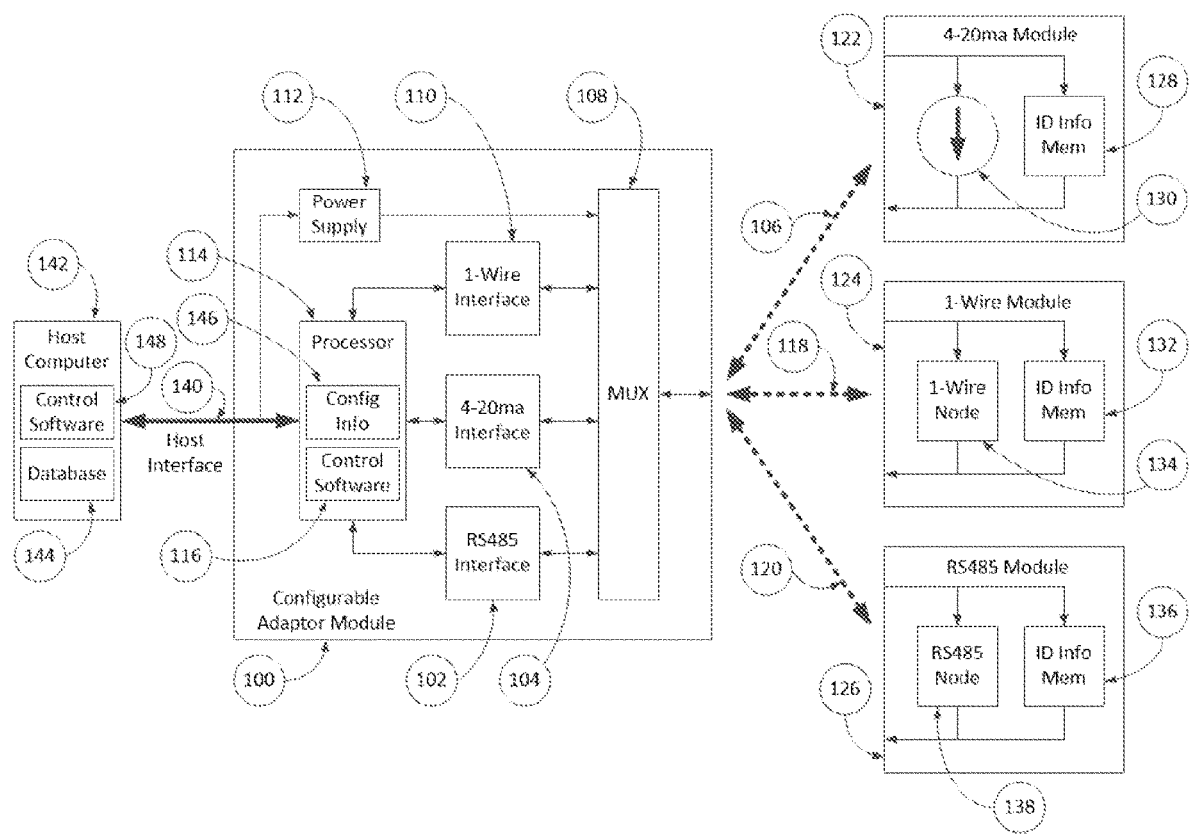
FIG 1 – Instrumentation Serial Interface System Block Diagram

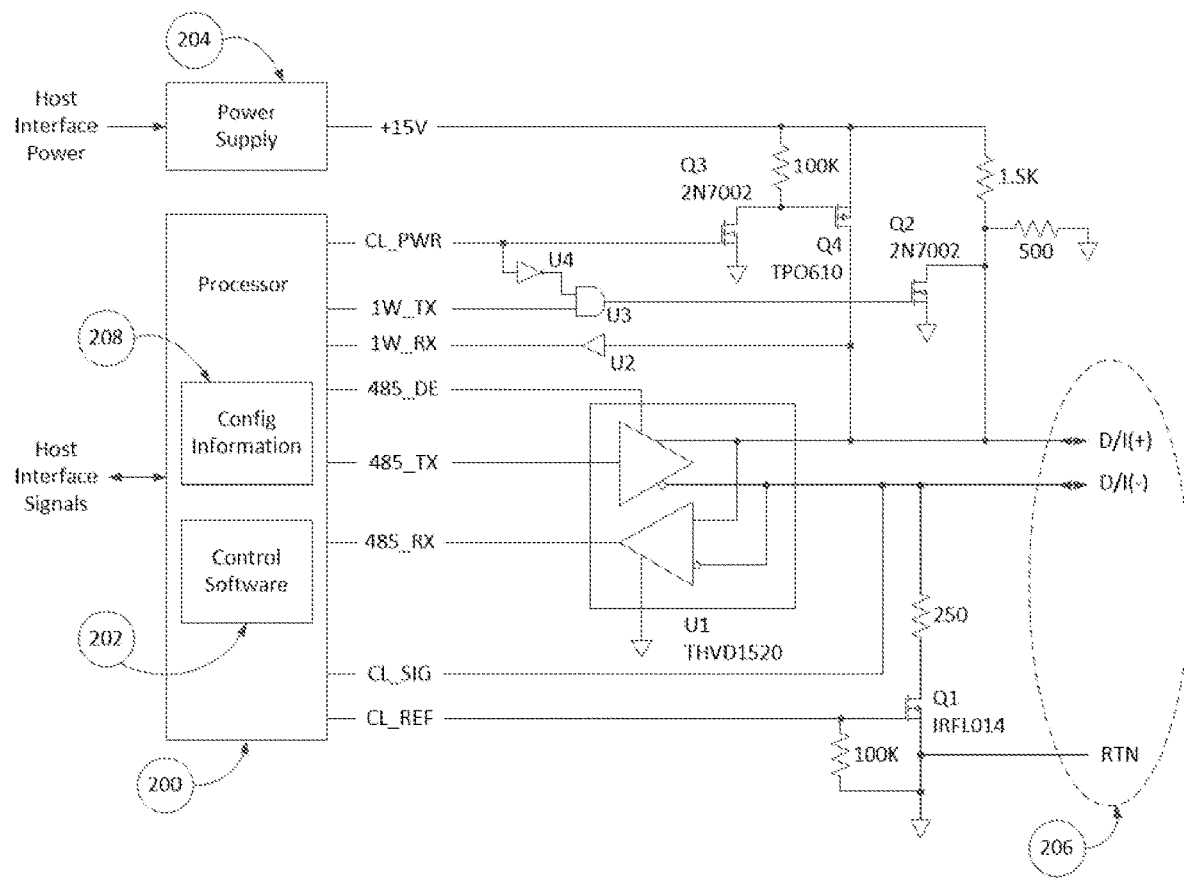
FIG 2 – Serial Interface Adaptor Module Schematic Diagram

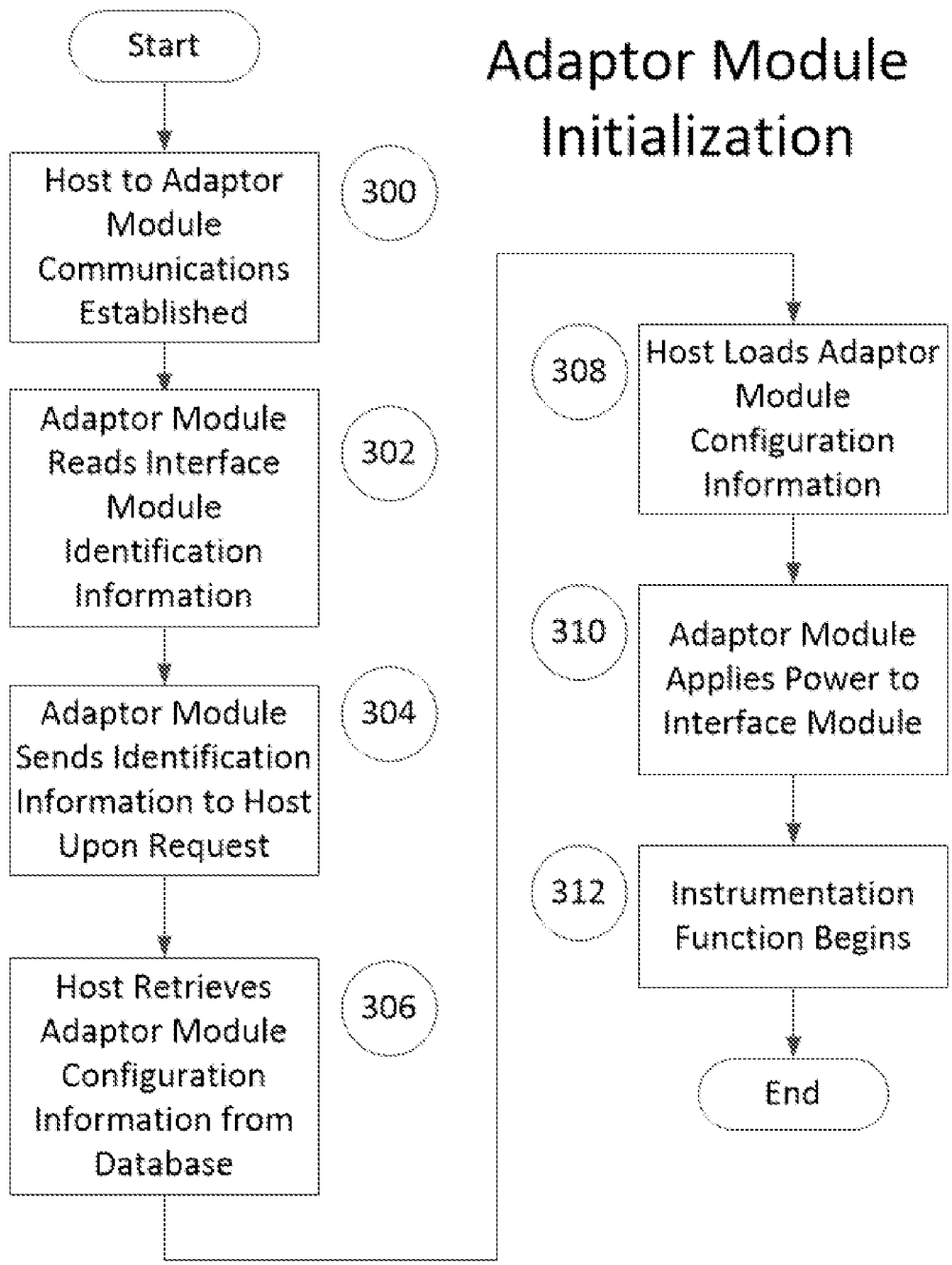
FIG 3 – Instrumentation System Configuration Flow Chart

INSTRUMENTATION SERIAL INTERFACE CONFIGURED WITH A COMMON ADAPTOR MODULE

BACKGROUND OF THE INVENTION

1. Field of the Invention

This invention relates to the field of computer-based instrumentation systems. Specifically, a method and system for the implementation of different instrumentation serial interface type functions using a configurable common adaptor module combined with a family of input/output interface modules. More specifically, this invention relates to the usage of a configurable common adaptor module to provide serial interface signals for different input/output interface modules each combining to form a unique instrumentation function or feature. Some example applications of instrumentation functions which can be implemented with the invention include Data Acquisition, Sensor Measurement Input (i.e. Temperature, Pressure, and Acceleration) and Waveform Generation.

2. Description of the Related Art

There are many known system configurations used within the modular computer-based instrumentation field. Most of these configurations are based around a mechanical multi-slot chassis with integrated electrical backplane supporting plug-in circuit card modules. Chassis and backplane elements can be proprietary or standards based allowing usage of modules from various suppliers. Backplane standards commonly found within the instrumentation field are VPX, VME, Compact PCI and several others. Various manufacturers offer an assortment of plug-in boards or complete systems used to build up application specific system configurations. One good example is the VME backplane, which supplies power, communication, timing and control signals to multiple plug-in circuit cards. The plug-in circuit cards typically comprise of a network interface, processor and several analog/digital input interfaces configured as a custom instrumentation system. The processor card contains software to sample the analog/digital inputs, perform data statistical operations and output results to the network. In these configurations, the plug-in circuit boards rely on the chassis backplane component for all system infrastructure support.

Another well-known alternative to a backplane-based instrumentation system is a configuration whereby individual sensor interface modules are connected to the controlling module in a serial communication peer-peer network fashion. Communication network standards commonly utilized within this peer-peer configuration are USB, Ethernet, PCIe for higher speed host computer connections and 1-Wire, RS-485, 4-20ma current loop for slower sensor interface connections. Individual sensor interface modules can be completely self-contained to include all functionality (power, communication, timing and control) necessary to fully support sensor operation. In these configurations, each sensor can be placed remotely from the computer based on cabling interconnections possible with the peer-peer network topology. Cabled serial interface communications, while having data rates generally slower than a backplane based implementation, offer the advantage of long distance separation between the host computer system and physical sensor locations.

In recent years, instrumentation system configuration has moved towards a more automated approach based on the development of network standards. These systems require modules acting as part of an automatic configuration process to contain self capability descriptive data or driver firmware available to a system controller module by network queries. Multiple standards have been developed by both commercial and open source organizations offering variations in such things as programming language, operating system, network topology and security aspects. As an example, the EtherCAT standard based on Ethernet networking has the capability of automatic configuration. Each module in the network contains a "Slave Information File" containing capability information about device functionality and settings. This file is used by a configuration management function to compile network information in an offline mode prior to operational usage. In comparison, several commercially available application building software development platforms can be used to support manual instrumentation system integration. Other highly embedded implementations utilize custom control software written in C or Python to implement system control. With either of these implementations, commonly the manufacturer of interface circuit cards or modules will provide a low level driver software component manually configured as required. This significantly limits reconfiguration flexibility.

Automatic instrumentation system configuration has been addressed in the prior art for differing levels of component integration. Divjak in U.S. Pat. No. 5,444,644 (22 Aug. 1995) titled "Auto-Configured Instrumentation Interface" describes a system with capability to identify different type of input/output sensor devices connected to its inputs. The input devices are described as physical sensor types for example a RTD, Pressure sensor or Potentiometer. In this implementation, a processor performs a systematic analysis by stimulating the input device to determine the sensor type and capability. This configuration is limited to automatic configuration for input device (sensor) types supported by the interface circuitry and not the input interface itself. Several more recent patents cite this reference but are limited to the same concept of sensor input device automatic configuration.

The next level of component integration addressed in prior art is a self contained input/output interface function coupled between the controlling module and physical sensor. Matsuura in U.S. Pat. No. 6,301,508 (9 Oct. 2001) titled "Automatic Instrumentation System" describes a system of controller and instrument modules connected by a communication line link. The controller module queries each instrument module over the communication link and receives a unique executable control program for module interfacing. These control programs are stored on a memory within each individual instrumentation module allowing the controller to perform an automatic system configuration. This method of configuration is analogous to the method described above whereby each interface module contains configuration information accessed by the control module. Slattery et al in U.S. Pat. No. 10,181,853 (15 Jan. 2019) titled "Configurable Hardware Platform for Measurement or Control" describes a system whereby a control circuit receives configuration information from an interface circuit used to configure the interface circuit. The configuration information is described as a "table" or "information stored in registers or a memory". Configuration information received by the control circuit contains detailed modes/capabilities supported by the interface circuit thereby requiring a more complicated table or file data structure. Paz Lopez et al in US 2014/0148952

(29 May 2014) titled "Central Node and Terminal Instrumentation Node for Self-Configuring and Secure Building Automation System" describes a distributed network concept whereby instrumentation nodes auto configure with a central control node when added to the system. The automatic configuration steps comprise: 1) an instrumentation node sending unsolicited configuration information to the control note, 2) the control node adding the instrumentation node into the network configuration database, and 3) the control node sending control software to the instrumentation node if required. All of these prior art systems described above teach a method whereby configuration information is transferred from a remote interface module to a control module. The present invention offers a simplification of the remote interface module design eliminating any software or processor hardware necessary to support transfer of embedded configuration data or code.

BRIEF SUMMARY OF THE INVENTION

The present invention comprises an instrumentation serial interface system configured by a common adaptor module for interface with selectable interface modules each providing a unique instrumentation function or feature. The invention provides automatic hardware and software reconfigurable implementation by connection of the adaptor module to an input/output interface module. Specific serial interface electrical signaling required to support each type of interface module electrical requirements (power and communications) are provided by the properly configured common adaptor module. Different interface modules are identified through unique identification information retrieved by the adaptor module and transferred to a host computer. The host computer retrieves configuration information from a database based on the identification information. This configuration information is loaded into the common adaptor module to provide the control/timing interface matching interface module configuration. Examples of general interface modules could provide functions for: Data Acquisition, Waveform Generation or Sensor interface.

BRIEF DESCRIPTION OF THE DRAWINGS

FIG. 1 is a system block diagram for the present invention.

FIG. 2 is an example schematic diagram for the serial interface adaptor module.

FIG. 3 is a flow chart detailing the process steps taken to configure the serial interface adaptor module.

REFERENCE NUMERALS IN THE DRAWINGS

| 100 | Serial Interface Adaptor Module | 102 | RS485 Interface |
| --- | --- | --- | --- |
| 104 | 4-20ma Current Loop Interface | 106 | 4-20ma Interface Signaling |
| 108 | Interface Signal MUX | 110 | 1-Wire Interface |
| 112 | Power Supply | 114 | Processor |
| 116 | Control Software Executing on Processor | 118 | 1-Wire Interface Signaling |
| 120 | RS485 Interface Signaling | 122 | 4-20ma Interface Module |
| 124 | 1-Wire Interface Module | 126 | RS485 Interface Module |
| 128 | Identification Information Memory in the 4-20ma Interface Module | 130 | Interface Module Application Specific 4-20ma Functional Node |
| 132 | Identification Information Memory in the 1-Wire Interface Module | 134 | Interface Module Application Specific 1-Wire Functional Node |
| 136 | Identification Information Memory in the RS485 Interface Module | 138 | Interface Module Application Specific RS485 Functional Node |
| 140 | Host Interface | 142 | Host Computer |
| 144 | Configuration Information Database | 146 | Adaptor Module Configuration Information |
| 148 | Control Software Executing on Host Computer | | |
| 200 | Serial Interface Adaptor Module Processor | 202 | Control Software Executing on the Processor |
| 204 | Adaptor Module Power Supply | 206 | Interface Module Signal Interface |
| 300 | Process Step to Establish Host Computer to Adaptor Module Communications | 302 | Process Step for Adaptor Module to Read Interface Module Identification Information |
| 304 | Process Step for Adaptor Module to Send Identification Information to Host Computer Upon Request | 306 | Process Step for Host to Retrieve Adaptor Module Configuration Information from Database Based on the Identification Information |
| 308 | Process Step for Host Computer to Load Configuration Information into Adaptor Module | 310 | Process Step for Adaptor Module to Apply Power to Interface Module |
| 312 | Process Step for Instrumentation Functionality to Begin | | |

DETAILED DESCRIPTION OF THE INVENTION

The preferred embodiment system block diagram of the present invention is shown in FIG. 1 as a general interface adaptor. In this discussion of FIG. 1, only a single type of Interface Module 122, 124 or 126 can be connected to Adaptor Module 100. This connection of only one type of interface module (i.e. either 122 or 124 or 126) to the adaptor module is depicted in FIG. 1 by a dashed line. Host Computer 142 is configured to execute a Control Software 148 application used to interface with the Adaptor Module 100. Host Interface 140 provides data communications between the Host Computer 142 and Adaptor Module 100. Host Interface 140 also can supply operating power to the Adaptor Module 100. Some example interfaces supporting higher data rate implementations of Interface 140 can include but are not limited to USB, Ethernet and PCIe. Configuration Information 146 is loaded into the Adaptor Module 100 by Host Computer 142 during initialization. Examples of Configuration Information 146 can include but are not limited to Firmware, Software or Parameter type data. Signal Interface types 106, 118 and 120 provide power/control functions supporting data transfers between Adaptor Module 100 and Interface Module types 122, 124 and 126 respectively. Specifically, Interface 106 signals support 4-20ma current loop Interface Module 122, Interface 118 signals support 1-Wire Interface Module 124 and Interface 120 signals support RS485 Interface Module 126. Interfaces 106, 118 and 120 also support query of interface module identification information used to identify the selectable interface module type. The identification information is unique to each type of different application specific interface modules and accessed during initialization. Examples of identification information can include but are not limited to a binary code or an ASCII string. At initialization, Adaptor Module 100 accesses Interface Module 122, 124 or 126 retrieving the Identification Information 128, 132 or 146 respectively. The identification information is transferred to Host Computer 142 upon request wherein Control Software 148 accesses Database 144 to retrieve associated Configuration Information 146. Configuration Information 146 is then loaded into Adaptor Module 100 to complete the system configuration process. Interfaces 106, 118 or 120 provide differing serial interface electrical signals to an interface module as determined by Configuration Information 146. Interface modules can be designed to provide internal sensors or I/O signals for connection to external devices or modules. Examples of different Interface Module I/O signals can include but are not limited to Digital In/Out, Analog In/Out, Sensor In/out or any signals needed to support the instrumentation application. The present invention supports automatic configuration with minimal hardware since only identification information is sent to the host computer.

FIG. 2 shows an example schematic block diagram of Adaptor Module 100 from FIG. 1. As shown in FIG. 2, Processor 200 connects to the host interface and executes Control Software 202. Interface module specific Configuration Information 208 is loaded via the host interface during initialization. Host interface power is input to Power Supply 204 to generate a voltage supply supporting the Interface Module Signal Interface 206. Processor 200 interacts with the signal MUX components using dedicated digital or analog input/output lines as controlled by Configuration Information 208. The signal MUX supports three electrical types of instrumentation serial interfaces: 4-20ma current loop, 1-Wire and RS485. During initialization, the 1-Wire interface is first selected to retrieve identification information from the interface module. The required electrical interface for the interface module full operation is later selected based on Configuration Information 146. An example initialization is now provided for the 4-20ma type Interface Module 122 with reference to FIG. 1. The initial step of retrieving interface module identification information is performed without power applied to the entire interface module whereby only the Identification Information Memory 128 is powered. Upon reception of Identification Information from Memory 128 using 1-Wire signaling of Interface 106, adaptor module Host Interface 140 transmits the info to Host Computer 142 upon request. The host computer Control Software 148 transmits Configuration Information 146 associated with Identification Information retrieved from Memory 128 back to the Adaptor Module 100 thereby configuring the module for full operation using 4-20ma signaling of Interface 106.

Electrical components shown in FIG. 2 involved in configuration of Adaptor Module 100 by the host computer interface are now described. Initially, the adaptor module Processor 200 will query the interface module Identification Information using the 1-Wire interface. Operation of the 1-Wire interface is provided using the 1W_TX and 1W_RX signals. 1W_TX transmits data by controlling Q2; 1W_RX receives level shifted data by U2. Logic gates U3 and U4 select between the application of 4-20ma current loop power and 1-Wire data transmission. During 1-Wire operation U1 is disabled by signal 485_DE. U1 RS485 transceiver part THVD1520 is specified as having a ⅛-unit load corresponding to 96 K ohm receiver input impedance. This higher level of receiver input impedance is necessary to eliminate any operational interference with the 1-Wire or current loop interfaces. Interface Module Signal Interface 206 for a 1-Wire connection are made via D/I(+) and RTN with D/I(−) left open. Operation of the RS485 interface is provided using the 485_DE, 485_TX and 485_RX signals. It is assumed termination resistors required by the RS485 interface and interface module power is provided externally. 485_DE enables the U1 RS485 transmitter while 485_TX transmits data and 485_RX receives data. Interface Module Signal Interface 206 for a RS485 connection are made via D/I(+), D/I(−) and RTN. Operation of the 4-20ma current loop is provided using the CL_PWR, CL_SIG and CL_REF signals. CL_PWR enables the application of 15V for current loop voltage supply thru Q4 while CL_REF enables the current monitor resistor thru Q1. CL_SIG samples the analog current level using an internal analog to digital converter to Processor 200. Interface Module Signal Interface 206 for a 4-20ma current loop connection are made via D/I(+), D/I(−) and RTN. In this configuration, the Identification Data Memory 128 is connected between D/I(+) and RTN while Current Loop Node 130 connects between D/I(+) and D/I(−). Electrically, the 1-Wire or RS485 signaling interfaces can support connection of multiple interface modules limited by drive or loading levels of the adaptor module.

FIG. 3 shows a flow chart of the process steps involved in configuration of the adaptor module by the host computer. Again in this discussion of FIG. 3, only a single type of Interface Module 122, 124 or 126 can be connected to Adaptor Module 100. Initially, Host Computer 142 will establish communications with Adaptor Module 100 per step 300. Step 302 is performed next whereby the Adaptor Module 100 reads Identification Information 128, 132 or 136 from the Interface Module 122, 124 or 126 respectively. After identification information reading, the Adaptor Module 100 sends the info back to Host Computer 142 upon request for processing by software per step 304. Next in step 306, the Host Computer 142 retrieves Adaptor Module 100 configuration information from Database 144 based on the identification code. The host will now load Configuration Information 146 into the Adaptor Module 100 per step 308 to properly operate with Interface Module 122, 124 or 126. Step 310 is only performed after module configuration whereby the Host Computer 142 commands Adaptor Module 100 to apply interface 106, 118 or 120 to the Interface Module 122, 124 or 126. Finally, step 312 commences normal instrumentation function for the specific application.

A first alternate embodiment of the present invention consists of an adaptor module coupled to the host computer using an USB serial interface. The adaptor module is powered by the USB interface or can be supplemented with external voltage source for higher consumption applications. This type of embodiment would support high data rate applications.

A second alternate embodiment of the present invention consists of an adaptor module coupled to the host computer using an Ethernet serial interface. The adaptor module is powered by the "Power over Ethernet" feature or can be supplemented with external power for higher consumption applications. This type of embodiment would support high data rate applications.

A third alternate embodiment of the present invention consists of an adaptor module coupled to the host computer using a PCIe serial interface. The adaptor module is by external power since the standard PCIe interface does not contain a dedicated power capability. This type of embodiment would support high data rate applications.

The claimed invention is:

1. A self configuring instrumentation system comprising:
   a. a host computer executing control software;
   b. a serial communication adaptor module coupled to the host computer, the serial communication adaptor module generating control and data information in response to the host computer;
   c. an application specific serial interface module coupled to the serial communication adaptor module, the interface module generating data information in response to the serial communication adaptor module;
   d. wherein the serial communication adaptor module is configured to obtain identification information from the un-powered interface module;
   e. wherein the host computer is configured to obtain identification information from the serial communication adaptor module;
   f. wherein the host computer is configured to retrieve configuration information from a database based on the identification information and load configuration information into the serial communication adaptor module; and
   g. wherein the serial communication adaptor module is configured to apply power to the interface module after being loaded with the serial communication adaptor module configuration information.

2. The system of claim 1, wherein the interface module is configured to perform data acquisition.

3. The system of claim 1, wherein the interface module is configured to perform sensor interfacing.

4. The system of claim 1, wherein the interface module is configured to perform waveform generation.

5. A method of instrumentation system self configuration comprising:
   a. executing control software on a host computer;
   b. generating control and data information by a serial communication adaptor module in response to the host computer;
   c. generating data information by an application specific serial interface module in response to the serial communication adaptor module;
   d. transferring identification information from the un-powered interface module to the serial communication adaptor module;
   e. transferring identification information from the serial communication adaptor module to the host computer;
   f. retrieving configuration information from a database based on the identification information;
   g. loading configuration information into the serial communication adaptor module; and
   h. applying power to the interface module by the serial communication adaptor module after being loaded with the serial communication adaptor configuration information.

6. The method of claim 5, further comprising configuring the interface module to perform data acquisition.

7. The method of claim 5, further comprising configuring the interface module to perform sensor interfacing.

8. The method of claim 5, further comprising configuring the interface module to perform waveform generation.

* * * * *